US000001483H

United States Statutory Invention Registration [19]

[11] Reg. Number: H1483

Larson et al.

[43] Published: Sep. 5, 1995

[54] LIQUID DEVELOPER COMPOSITIONS

[76] Inventors: James R. Larson, 11 Wolfboro Dr., Fairport, N.Y. 14450; John W. Spiewak, 773 Saffron La., Webster, N.Y. 14580; Anthony M. Wallace, 120 Greystone La., Apt. 22, Rochester, N.Y. 14618

[21] Appl. No.: 65,414

[22] Filed: May 24, 1993

[51] Int. Cl.[6] ..... G03G 9/00

[52] U.S. Cl. ..... 430/115

[58] Field of Search ..... 430/115

[56] References Cited

U.S. PATENT DOCUMENTS

| | | | |
|---|---|---|---|
| 4,707,429 | 11/1987 | Trout | 430/115 |
| 5,019,477 | 5/1991 | Felder | 430/115 |
| 5,026,621 | 6/1991 | Tsubako et al. | 430/109 |
| 5,030,535 | 7/1991 | Drappel et al. | 430/116 |
| 5,035,972 | 7/1991 | El-Sayed et al. | 430/114 |
| 5,045,425 | 9/1991 | Swidler | 430/115 |
| 5,130,221 | 7/1992 | El-Sayed et al. | 430/114 |

*Primary Examiner*—Donald P. Walsh
*Assistant Examiner*—Chrisman D. Carroll

[57] ABSTRACT

A liquid developer comprised of thermoplastic resin particles, and a charge director comprised of an ammonium AB diblock copolymer of the formula

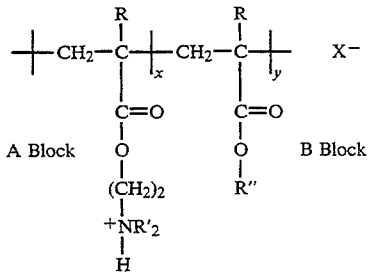

wherein $X^-$ is a conjugate base or anion of a strong acid, R is hydrogen or alkyl, R′ is alkyl, R″ is an alkyl group containing from about 6 to about 20 carbon atoms, and y and x represent the number average degree of polymerization (DP) wherein the ratio of y to x is in the range of from about 10 to 2 to about 100 to 20.

32 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID DEVELOPER COMPOSITIONS

BACKGROUND OF THE INVENTION

This invention is generally directed to liquid developer compositions and, more specifically, the present invention relates to a liquid developer containing protonated ammonium AB diblock copolymers as charge directors. More specifically, the present invention relates to liquid developers comprised of a suitable carrier liquid and as a charge director certain ammonium AB diblock copolymers. The developers of the present invention can be selected for a number of known imaging systems, such as xerographic imaging and printing processes, wherein latent images are rendered visible with the liquid developer illustrated herein. The image quality, solid area coverage and resolution for developed images usually require, for example, sufficient toner particle electrophoretic mobility. The mobility for effective image development is primarily dependent on the imaging system used, and this electrophoretic mobility is directly proportional to the charge on the toner particles and inversely proportional to the viscosity of the liquid developer fluid. For example, a 10 to 30 percent change in fluid viscosity caused for instance by a 5° to 15° C. decrease in temperature could result in a decrease in image quality, poor, or unacceptable image development and undesirable background development, for example, because of a 5 percent to 23 percent decrease in electrophoretic mobility. Insufficient particle charge can also result in poor, or no transfer of the toner to paper or other substrates. Poor transfer, for example, can result in poor solid area coverage if insufficient toner is transferred to the final substrate and can also result in image defects such as smearing and hollowed fine features. Other problems, resolved, or substantially eliminated with the present invention and which can effect the performance and reliability of a liquid developer include 1) the inability to develop or transfer onto certain fluoroelastomer substrates, such as VITON ® available from E. I. DuPont, due to a charge exchange reaction between the substrate and the liquid developer; and 2) an instantaneous decrease of from about 10 percent to 75 percent in the particle charge upon the addition of additional charge director material which is added into an operating imaging system to maintain the conductivity of the developer within preset bounds, usually between 5 and 20 ps/cm. To overcome or minimize such problems, the liquid toners of the present invention were arrived at after extensive research efforts, and which toners result in, for example, sufficient particle charge, generally corresponding to an ESA mobility greater than 1.5 E-10 $m^2/Vs$ for excellent transfer and maintaining the mobility within the desired range of the particular imaging system employed. Advantages associated with the present invention include the use of certain economical ammonium AB diblock copolymers as charge directors that are superior to other known charge directors, like BASIC BARIUM PETRONATE TM and quaternized ammonium AB diblock copolymers or other AB diblock copolymers, such as those illustrated in U.S. Pat. No. 5,130,221, in that they improve the desired negative charge on the developer particles; in some instances the improvement, as measured by ESA mobility, is from −0.2 E-10 $m^2/Vs$ when quaternized ammonium, AB diblock copolymers are used to −2.0 E-10 $m^2/Vs$ when protonated ammonium AB diblock copolymers of the present invention are selected. The greater toner charge results in improved toner transfer from the imaging member to a substrate like paper, transparency stock, or intermediate belt materials, such as VITON ®; and improvement in some instances was observed to be from essentially no transfer to a transfer of 80 percent to 90 percent of the image. The aforementioned desired charge can result in improved image development and enhanced transfer, and improved charging after the addition of additional charge director material.

A latent electrostatic image can be developed with toner particles dispersed in an insulating nonpolar liquid. Such dispersed materials are known as liquid toners or liquid developers. A latent electrostatic image may be generated by providing a photoconductive layer with a uniform electrostatic charge and subsequently discharging the electrostatic charge by exposing it to a modulated beam of radiant energy. Other methods are also known for forming latent electrostatic images such as, for example, providing a carrier with a dielectric surface and transferring a preformed electrostatic charge to the surface. After the latent image has been formed, the image is developed by colored toner particles dispersed in a nonpolar liquid. The image may then be transferred to a receiver sheet Also known are ionographic imaging systems.

Typical liquid developers can comprise a thermoplastic resin and a dispersant nonpolar liquid. Generally, a suitable colorant, such as a dye or pigment, is also present in the developer. The colored toner particles are dispersed in a nonpolar liquid which generally has a high volume resistivity in excess of $10^9$ ohm-centimeters, a low dielectric constant, for example below 3.0, and a high vapor pressure. Generally, the toner particles are less than 30 μm (microns) average by area size as measured with the Malvern 3600E particle sizer.

Since the formation of proper images depends on the difference of the charge between the toner particles in the liquid developer and the latent electrostatic image to be developed, it is desirable to add a charge director compound and optional charge adjuvants which increase the magnitude of the charge, such as polyhydroxy compounds, amino alcohols, polybutylene succinimide compounds, aromatic hydrocarbons, metallic soaps, and the like, to the liquid developer comprising the thermoplastic resin, the nonpolar liquid and the colorant. A charge director can be of importance in controlling the charging properties of the toner to enable excellent quality images.

In U.S. Pat. No. 5,035,972, the disclosure of which is totally incorporated herein by reference, there are illustrated liquid developers with quaternized ammonium AB diblock copolymer charge directors, and wherein the nitrogen in the ionic A block is quaternized with an alkylating agent, while with the invention of the present application there are selected for the developers as charge directors ammonium AB diblock copolymers wherein an acid is utilized to form the ammonium ion, and wherein the resulting developers have the advantages as illustrated herein, including a less costly charge director preparation process since, for example, with the ammonium AB diblock copolymers the conversion with the acid (HBr) only requires about 3 to 5 hours at ambient temperature whereas for the quaternized ammonium AB diblock copolymer the same conversion with the alkylating agent (methyl bromide) requires about 16 to about 20 hours at 50° to 60° C.; thus the acid conversion is a less energetic process. Also, the material's cost is considerably less for the HBr conversion than for the methyl bromide conversion. Using the prices in an Aldrich Chemical Company catalog for the least expensive source of methyl bromide, which is 99.5+ percent methyl bromide gas, and the least expensive source of HBr, which is the 48 percent aqueous hydrobromic acid solution, the cost of the methyl bromide in the conversion to the quaternized AB diblock copolymer will be 8 times greater than the cost of the hydrobromic acid in the conversion to the ammonium AB diblock copolymer with the liquid toners of the present invention acceptable particle charge at lower charge director levels, improved toner development and excellent transfer efficiency of one from 15 percent to 79 percent, and resolution improvement of from essentially zero development to a solid area having a reflectance density 1.0 and resolution of 8.5 Ip/millimeter) can be achieved in embodiments.

U.S. Pat. No. 5,019,477 to Felder, the disclosure of which is hereby totally incorporated by reference, discloses a liquid electrostatic developer comprising a nonpolar liquid, thermoplastic resin particles, and a charge director. The ionic or zwitterionic charge directors may include both negative charge directors such as lecithin, oil-soluble petroleum sulfonate and alkyl succinimide, and positive charge directors such as cobalt and iron naphthenates. The thermoplastic resin particles can comprise a mixture of (1) a polyethylene homopolymer or a copolymer of (i) polyethylene and (ii) acrylic acid, methacrylic acid or alkyl esters thereof, wherein (ii) comprises 0.1 to 20 weight percent of the copolymer; and (2) a random copolymer of (iii) selected from the group consisting of vinyl toluene and styrene and (iv) selected from the group consisting of butadiene and acrylate. As the copolymer of polyethylene and methacrylic acid or methacrylic acid alkyl esters, NUCREL® may be selected.

U.S. Pat. No. 5,030,535 to Drappel et al. discloses a liquid developer composition comprising a liquid vehicle, a charge control additive and toner particles. The toner particles may contain pigment particles and a resin selected from the group consisting of polyolefins, halogenated polyolefins and mixtures thereof. The liquid developers are prepared by first dissolving the polymer resin in a liquid vehicle by heating at temperatures of from about 80° C. to 120° C., adding pigment to the hot polymer solution and attriting the mixture, and then cooling the mixture so that the polymer becomes insoluble in the liquid vehicle, thus forming an insoluble resin layer around the pigment particles.

U.S. Pat. Nos. 3,852,208 and 3,933,664, both to Nagashima et al., disclose colored, light-transparent photoconductive material which can be obtained by a condensation reaction of organic photoconductive substances with reactive colored components. The chemical combination of an organic photoconductive substance having at least one amino or hydroxyl group with a color development component having at least one active halogen atom produces the color developing organic photoconductive materials. Alternatively, the color developing materials can be obtained from the combination of an organic photoconductive substance having at least one active halogen atom with a color developing component having at least one amino or hydroxyl group. The color developing organic photoconductive material may be pulverized in a ball-mill, a roll-mill or an atomizer to produce a toner for use as a dry or wet developing agent, or may be used in combination with other colored substances or vehicle resins.

U.S. Pat. No. 4,524,119 to Luly et al. discloses electrophotographic dry development carriers for use with toner particles wherein the carrier core particles are coated with fluorinated carbon or a fluorinated carbon-containing resin. By varying the fluorine content of the fluorinated carbon, systematic uniform variation of the resistivity properties of the carrier is permitted. Suitable binders for use with the carrier core particles may be selected from known thermoplastics, including fluoropolymers.

U.S. Pat. No. 5,026,621 to Tsubuko et al. discloses a toner for electrophotography which comprises as main components a coloring component and a binder resin which is a block copolymer comprising a functional segment (A) consisting of at least one of a fluoroalkylacryl ester block unit or a fluoroalkyl methacryl ester block unit, and a compatible segment (B) consisting of a fluorine-free vinyl or olefin monomer block unit. The functional segment of block copolymer is oriented to the surface of the block polymer and the compatible segment thereof is oriented to be compatible with other resins and a coloring agent contained in the toner, so that the toner is provided with both liquid-repelling and solvent-soluble properties.

U.S. Pat. No. 4,139,483 to Williams et al. discloses a finely divided dry toner composition comprising a colorant, a thermoplastic resin, and a surface active additive which is capable of providing a desired polarity and magnitude of triboelectric charging potential to the toner composition. The surface active additives are selected from highly fluorinated materials.

U.S. Pat. No. 4,388,396 to Nishibayashi et al. discloses developer particles comprising pigment particles, a binder and an offset-preventing agent selected from the group consisting of aliphatic fluorocarbon compounds and fluorochlorocarbon compounds. Electrical conductivity can be imparted to the developer by causing electrically conductive fine particles to adhere to the surfaces of the particles.

Moreover, in U.S. Pat. No. 4,707,429 there are illustrated, for example, liquid developers with an aluminum stearate charge adjuvant. Liquid developers with charge directors are illustrated in U.S. Pat. No. 5,045,425. Also, stain elimination in consecutive colored liquid toners is illustrated in U.S. Pat. No. 5,069,995.

In copending patent application U.S. Ser. No. 986,316,the disclosure of which is totally incorporated herein by reference, there is illustrated a process for forming images which comprises (a) generating an electrostatic latent image; (b) contacting the latent image with a developer comprising a colorant and a substantial amount of a vehicle with a melting point of at least about 25° C., said developer having a melting point of at least about 25° C., said contact occurring while the developer is maintained at a temperature at or above its melting point, said developer having a viscosity of no more than about 500 centipoise and a resistivity of no less than about $10^8$ ohm-cm at the temperature maintained while the developer is in contact with the latent image; and (c) cooling the developed image to a temperature below its melting point subsequent to development.

In copending patent applications U.S. Ser. No. 009,202 (D/92570), now U.S. Pat. No. 5,306,591, and U.S. Ser. No. 009,192 (D/92571), now U.S. Pat. No. 5,308,731, the disclosures of which are totally incorporated herein by reference, there is illustrated a liquid developer comprised of thermoplastic resin particles, a charge director, and a charge adjuvant comprised of an imine bisquinone; and a liquid developer comprised of a liquid, thermoplastic resin particles, a nonpolar liquid soluble charge director, and a charge adjuvant comprised of a metal hydroxycarboxylic acid, respectively. The charge adjuvants and other appropriate components of these copending applications may be selected for the liquid toners of the present invention.

The disclosures of each of the patents and the copending patent applications are totally incorporated herein by reference.

SUMMARY OF THE INVENTION

It is an object of the present invention to provide a liquid developer with many of the advantages illustrated herein.

Another object of the present invention resides in the provision of a liquid developer capable of high particle charging.

It is a further object of the invention to provide a liquid developer wherein there are selected as charge directors certain protonated ammonium AB diblock copolymers.

It is still a further object of the invention to provide a liquid developer wherein developed image defects such as smearing, loss of resolution and loss of density are eliminated, or minimized, and wherein there are selected economical charge directors that permit toners that can be easily transferred from imaging members such as photoreceptor drums.

Also, in another object of the present invention there are provided negatively charged liquid developers with certain charge directors that are in embodiments superior to, for example, liquid developers with BASIC BARIUM PETRONATE® and the AB diblock copolymers of the prior art in that they result in higher negative toner particle charge. The superior charge can result in improved image development and superior transfer is illustrated herein.

Another object of the present invention resides in the provision of liquid developers with known additives and adjuvants.

These and other objects of the present invention can be accomplished in embodiments by the provision of liquid developers with certain charge directors comprised of protonated AB diblock polymers. In embodiments, the present invention is directed to liquid developers comprised of a toner resin, pigment, and a charge director comprised of certain protonated ammonium AB diblock copolymers.

Embodiments of the present invention include a liquid developer comprised of thermoplastic resin particles, and a charge director comprised of a protonated AB diblock copolymer; a liquid developer, comprised of a liquid component, thermoplastic resin; a charge director comprised of certain AB diblock copolymer; and a liquid electrostatographic developer comprised of (A) a liquid having viscosity of from about 0.5 to about 20 centipoise and resistivity greater than $5\times10^9$; (B) thermoplastic resin particles with an average volume particle diameter of from about 0.1 to about 30 microns; (C) a charge director comprised of certain AB diblock copolymers as illustrated herein; and optionally (D) a charge adjuvant.

In embodiments, the present invention relates to a liquid developer comprised of thermoplastic resin particles, and a charge director comprised of an AB diblock copolymer of the formula

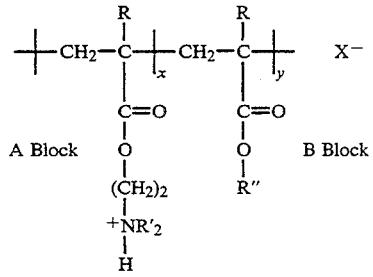

wherein $X^-$ is a conjugate base or anion of a strong acid, R is hydrogen or alkyl, R′ is alkyl, R″ is an alkyl group containing, for example, from about 6 to about 20 carbon atoms, and y and x represent the number average degree of polymerization (DP) of the B block and A block, respectively, wherein the ratio of y to x is in the range of, for example, from about 10 to 2 to about 100 to 20.

A liquid developer of the present invention is comprised of a liquid component, thermoplastic resin, and a charge director comprised of (1) a protonated AB diblock copolymer of poly[2-dimethylammoniumethyl methacrylate bromide co-2-ethylhexyl methacrylate], poly[2-dimethylammoniumethyl methacrylate tosylate co-2-ethylhexyl methacrylate], poly[2-dimethylammoniumethyl methacrylate chloride co-2-ethylhexyl methacrylate], poly[2-dimethylammoniumethyl methacrylate bromide co-2-ethylhexyl acrylate], poly[2-dimethylammoniumethyl acrylate bromide co-2-ethylhexyl methacrylate], poly[2-dimethylammoniumethyl acrylate bromide co-2-ethylhexyl acrylate], poly[2-dimethylammoniumethyl methacrylate tosylate co-2-ethylhexyl acrylate], poly[2-dimethylammoniumethyl acrylate tosylate co-2-ethylhexyl acrylate], poly[2-dimethylammoniumethyl methacrylate chloride co-2-ethylhexyl acrylate], poly[2-dimethylammoniumethyl acrylate chloride co-2-ethylhexyl acrylate], poly[2-dimethylammoniumethyl methacrylate bromide co-N,N-dibutyl methacrylamide], poly[2-dimethylammoniumethyl methacrylate tosylate co-N,N-dibutyl methacrylamide], poly[2-dimethylammoniumethyl methacrylate bromide co-N,N-dibutylacrylamide], or poly[2-dimethylammoniumethyl methacrylate tosylate co-N,N-dibutylacrylamide]; or (2) a mixture, for example 50:50, of at least two protonated AB diblock copolymers, and an optional charge adjuvant; a liquid developer, comprised of a liquid component, thermoplastic resin; and a charge director comprised of an ammonium protonated AB diblock copolymer; and a liquid electrostatographic developer, comprised of (A) a liquid having viscosity of from about 0.5 to about 20 centipoise and resistivity greater than $5\times10^9$; (B) thermoplastic resin particles with an average volume particle diameter of from about 0.1 to about 30 microns; (C) a charge director comprised of a protonated AB diblock copolymer; and optionally (D) a charge adjuvant.

The preferred diblock copolymers selected as charge directors for the present invention can be represented by the following formula

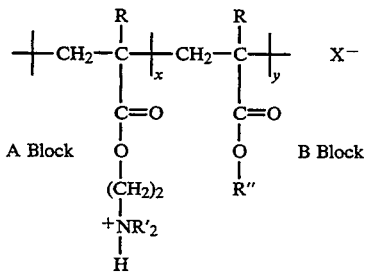

wherein A block has a number average molecular weight of from about 200 to about 10,000 and the B block has a number average molecular weight of from about 2,000 to about 50,000 wherein the number average degree of polymerization (DP) ratio of the B block to the A block is in the range of 10 to 2 to 100 to 20; X− is an anion of any strong acid, examples of which include fluoride, chloride, bromide, iodide, trifluoroacetate, trichloroacetate, bromoacetate, p-toluene sulfonate, methane sulfonate, dodecylbenzene sulfonate, trifluoromethane sulfonate, fluoroborate, hexafluorophosphate, sulfate, bisulfate, chlorosalicylate, tetrafluoroterephthalate, tetrafluorosuccinate, and the like; and R, R′ and R″ are as illustrated herein with R″ being preferably alkyl with about 6 to about 12 carbon atoms.

Examples of specific diblock copolymer charge directors present in effective amounts of, for example, from about 0.5 to about 20 weight percent, and preferably from about 1 to about 10 percent in embodiments or other amounts illustrated herein, include poly[2-dimethylammoniumethyl methacrylate bromide co-2-ethylhexyl methacrylate], poly[2-dimethylammoniumethyl methacrylate tosylate co-2-ethylhexyl methacrylate], poly[2-dimethylammoniumethyl methacrylate chloride co-2-ethylhexyl methacrylate], poly[2-dimethylammoniumethyl methacrylate bromide co-2-ethylhexyl acrylate], poly[2-dimethylammoniumethyl acrylate bromide co-2-ethylhexyl methacrylate], poly[2-dimethylammoniumethyl acrylate bromide co-2-ethylhexyl acrylate], poly[2-dimethylammoniumethyl methacrylate tosylate co-2-ethylhexyl acrylate], poly[2-dimethylammoniumethyl acrylate tosylate co-2-ethylhexyl acrylate], poly[2-dimethylammoniumethyl methacrylate chloride co-2-ethylhexyl acrylate], poly[2-dimethylammoniumethyl acrylate chloride co-2-ethylhexyl acrylate], poly[2-dimethylammoniumethyl methacrylate bromide co-N,N-dibutyl methacrylamide], poly[2-dimethylammoniumethyl methacrylate tosylate co-N,N-dibutyl methacrylamide], poly[2-dimethylammoniumethyl methacrylate bromide co-N,N-dibutylacrylamide], and poly[2-dimethylammoniumethyl methacrylate tosylate co-N,N-dibutylacrylamide].

Other examples of suitable diblock copolymer charge directors include poly[4-vinyl-N,N-dimethylanilinium bromide co-2-ethylhexyl methacrylate], poly[4-vinyl-N,N-dimethylanilinium tosylate co-2-ethylhexyl methacrylate], poly[ethylenimmonium bromide co-2-ethylhexyl methacrylate], and poly[propylenimmonium bromide co-2-ethylhexyl methacrylate].

A preferred ammonium AB diblock copolymer charge director of this invention contains a polar A block in which the positive ammonium nitrogen is covalently bound to at least one hydrogen and a nonpolar B block which has sufficient aliphatic content to enable the block copolymer to more effectively dissolve in the nonpolar liquid having a Kauri-butanol value of less than 30. The A block has a number average molecular weight range of from about 200 to about 10,000 and the B block has a number average molecular weight range of from about 2,000 to 50,000. Number average degree of polymerization (DP) refers to the average number of monomeric units per polymer chain, and is related to the number average molecular weight ($M_n$) by the formula $M_n = M_0 \times DP$, where $M_0$ is the molecular weight of the monomer. Assuming an average $M_0$ of about 200 for both the A and B monomers, the above A block molecular weight ranges provide for a DP of about 1 to 50 and the above B block molecular weight ranges provide for a DP of about 10 to 250. Amine nitrogen protonation (ammonium ion formation) in the polar A block for satisfactory charge director performance should be at least 80 mole percent and preferably at least 90 mole percent.

The charge director can be selected for the liquid developers in various effective amounts, such as for example in embodiments from about 0.5 percent to 100 percent by weight relative to developer solids and preferably 2 percent to 20 percent by weight relative to developer solids. Developer solids includes toner resin, optional pigment, and optional charge adjuvant. Without pigment the developer may be selected for the generation of a resist, a printing plate, and the like.

Examples of liquid carriers selected for the developers of the present invention include a liquid with an effective viscosity as measured, for example, by a number of known methods such as capillary viscosimeters, coaxial cylindrical rheometers, cone and plate rheometers, and the like of, for example, from about 0.5 to about 500 centipoise, and preferably from about 1 to about 20 centipoise, and a resistivity equal to or greater than $5 \times 10^9$ ohm/cm, such as $5 \times 10^{13}$. Preferably, the liquid selected is a branched chain aliphatic hydrocarbon as illustrated herein. A nonpolar liquid of the ISOPAR ® series (manufactured by the Exxon Corporation) may also be used for the developers of the present invention. These hydrocarbon liquids are considered narrow portions of isoparaffinic hydrocarbon fractions with extremely high levels of purity. For example, the boiling point range of ISOPAR G ® is between about 157° C. and about 176° C.; ISOPAR H ® is between about 176° C. and about 191° C.; ISOPAR K ® is between about 177° C. and about 197° C.; ISOPAR L ® is between about 188° C. and about 206° C.; ISOPAR M ® is between about 207° C. and about 254° C.; and ISOPAR V ® is between about 254.4° C. and about 329.4° C. ISOPAR L ® has a mid-boiling point of approximately 194° C. ISOPAR M ® has an auto ignition temperature of 338° C. ISOPAR G ® has a flash point of 40° C. as determined by the tag closed cup method; ISOPAR H ® has a flash point of 53° C. as determined by the ASTM D-56 method; ISOPAR L ® has a flash point of 61° C. as determined by the ASTM D-56 method; and ISOPAR ®M has a flash point of 80° C. as determined by the ASTM D-56 method. The liquids selected should have an electrical volume resistivity in excess of $10^9$ ohm-centimeters and a dielectric constant below 3.0. Moreover, the vapor pressure at 25° C. should be less than 10 Torr in embodiments.

While the ISOPAR ® series liquids are the preferred nonpolar liquids for use as dispersants in the liquid developers of the present invention, the essential characteristics of viscosity and resistivity may be satisfied with other suitable liquids. Specifically, the NORPAR ® series available from Exxon Corporation, the SOLTROL® series available from the Phillips Petroleum Company, and the SHELLSOL® series available from the Shell Oil Company can be selected.

The amount of the liquid employed in the developer of the present invention is, for example, from about 75 percent to about 99.9 percent, and preferably from about 95 to about 99 percent by weight of the total developer dispersion. The total solids content of the developer is, for example, 0.1 to 10 percent by weight, preferably 0.3 to 3 percent, and more preferably, 0.5 to 2.0 percent by weight.

Typical suitable thermoplastic toner resin can be selected for the liquid developers of the present invention in effective amounts of, for example, in the range of about 99 percent to about 40 percent, and preferably about 95 percent to about 70 percent of developer solids, comprised of thermoplastic resin, pigment, charge adjuvant, and in embodiments other components such as magnetic materials, like magnetites that may comprise the developer. Generally, developer solids include the thermoplastic resin, optional pigment and charge control agent. Examples of resins include ethylene vinyl acetate (EVA) copolymers, (ELVAX® resins, E. I. DuPont de Nemours and Company, Wilmington, Del.); copolymers of ethylene and an $\alpha$-$\beta$-ethylenically unsaturated acid selected from the group consisting of acrylic acid and methacrylic acid; copolymers of ethylene (80 to 99.9 percent), acrylic or methacrylic acid (20 to 0.1 percent)/alkyl ($C_1$ to $C_5$) ester of methacrylic or acrylic acid (0.1 to 20 percent); polyethylene; polystyrene; isotactic polypropylene (crystalline); ethylene ethyl acrylate series sold under the trademark BAKELITE® DPD 6169, DPDA 6182 NATURAL™ (Union Carbide Corporation, Stamford, Conn.); ethylene vinyl acetate resins like DQDA 6832 Natural 7 (Union Carbide Corporation); SURLYN® ionomer resin (E. I. DuPont de Nemours and Company); or blends thereof; polyesters; polyvinyl toluene; polyamides; styrene/butadiene copolymers; epoxy resins; acrylic resins, such as a copolymer of acrylic or methacrylic acid (optional but preferred), and at least one alkyl ester of acrylic or methacrylic acid wherein alkyl is 1 to 20 carbon atoms, such as methyl methacrylate (50 to 90 percent)/methacrylic acid (0 to 20 percent)/ethylhexyl acrylate (10 to 50 percent); and other acrylic resins including ELVACITE® acrylic resins (E. I. DuPont de Nemours and Company); or blends thereof. Preferred copolymers selected in embodiments are comprised of the copolymer of ethylene and an $\alpha$-$\beta$-ethylenically unsaturated acid of either acrylic acid or methacrylic acid. In a preferred embodiment, NUCREL® resins available from E. I. DuPont de Nemours and Company like NUCREL 599®, NUCREL 699®, or NUCREL 960® are selected as the thermoplastic resin.

The liquid developer of the present invention may optionally contain a colorant dispersed in the resin particles. Colorants, such as pigments or dyes like black, cyan, magenta, yellow, red, blue, green, brown, and mixtures such as wherein any one colorant may comprise from 0.1 to 99.9 weight percent percent of the colorant mixture with the second, or other colorants comprising the remaining percentage thereof are preferably present to render the latent image visible.

The colorant may be present in the resin particles in an effective amount of, for example, from about 0.1 to about 60 percent, and preferably from about 1 to about 30 percent by weight based on the total weight of solids contained in the developer. The amount of colorant used may vary depending on the use of the developer, for instance if the toned image is to be used to form a chemical resist image no pigment is necessary. Examples of pigments which may be selected include carbon blacks available from, for example, Cabot Corporation, FANAL PINK™, PV FAST BLUE™, those pigments as illustrated in copending patent application U.S. Ser. No. 755,919 (D/90404), now U.S. Pat. No. 5,223,368, the disclosure of which is totally incorporated herein by reference; and the following.

| PIGMENT BRAND NAME | MANUFACTURER | COLOR |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| L74-1357 Yellow | Sun Chemical | Yellow 14 |
| L75-1331 Yellow | Sun Chemical | Yellow 17 |
| Hansa Yellow RA | Hoechst | Yellow 73 |
| Hansa Brilliant Yellow 5GX-02 | Hoechst | Yellow 74 |
| DALAMAR ® YELLOW YT-858-D | Heubach | Yellow 74 |
| Hansa Yellow X | Hoechst | Yellow 75 |
| NOVAPERM ® YELLOW HR | Hoechst | Yellow 83 |
| L75-2337 Yellow | Sun Chemical | Yellow 83 |
| CROMOPHTHAL ® YELLOW 3G | Ciba-Geigy | Yellow 93 |
| CROMOPHTHAL ® YELLOW GR | Ciba-Geigy | Yellow 95 |
| NOVAPERM ® YELLOW FGL | Hoechst | Yellow 97 |
| Hansa Brilliant Yellow 10GX | Hoechst | Yellow 98 |
| LUMOGEN ® LIGHT YELLOW | BASF | Yellow 110 |
| Permanent Yellow G3R-01 | Hoechst | Yellow 114 |
| CROMOPHTHAL ® YELLOW 8G | Ciba-Geigy | Yellow 128 |
| IRGAZINE ® YELLOW 5GT | Ciba-Geigy | Yellow 129 |
| HOSTAPERM ® YELLOW H4G | Hoechst | Yellow 151 |
| HOSTAPERM ® YELLOW H3G | Hoechst | Yellow 154 |
| HOSTAPERM ® ORANGE GR | Hoechst | Orange 43 |
| PALIOGEN ® ORANGE | BASF | Orange 51 |
| IRGALITE ® RUBINE 4BL | Ciba-Geigy | Red 57:1 |
| QUINDO ® MAGENTA | Mobay | Red 122 |
| INDOFAST ® BRILLIANT SCARLET | Mobay | Red 123 |
| HOSTAPERM ® SCARLET GO | Hoechst | Red 168 |
| Permanent Rubine F6B | Hoechst | Red 184 |
| MONASTRAL ® MAGENTA | Ciba-Geigy | Red 202 |
| MONASTRAL ® SCARLET | Ciba-Geigy | Red 207 |
| HELIOGEN ® BLUE L 6901F | BASF | Blue 15:2 |
| HELIOGEN ® BLUE TBD 7010 | BASF | Blue:3 |
| HELIOGEN ® BLUE K 7090 | BASF | Blue 15:3 |
| HELIOGEN ® BLUE L7101F | BASF | Blue 15:4 |
| HELIOGEN ® BLUE L 6470 | BASF | Blue 60 |
| HELIOGEN ® GREEN K 8683 | BASF | Green 7 |
| HELIOGEN ® GREEN L 9140 | BASF | Green 36 |
| MONASTRAL ® VIOLET | Ciba-Geigy | Violet 19 |
| MONASTRAL ® RED | Ciba-Geigy | Violet 19 |
| QUINDO ® RED 6700 | Mobay | Violet 19 |
| QUINDO ® RED 6713 | Mobay | Violet 19 |
| INDOFAST ® VIOLET | Mobay | Violet 19 |
| MONASTRAL ® VIOLET Maroon B | Ciba-Geigy | Violet 42 |
| STERLING ® NS BLACK | Cabot | Black 7 |
| STERLING ® NSX 76 | Cabot | |
| TIPURE ® R-101 | DuPont | White 6 |
| MOGUL ® L | Cabot | Black, CI 77266 |
| UHLICH ® BK 8200 | Paul Uhlich | Black |

The charge on the toner particles alone may be measured in terms of particle mobility using a high field measurement device. Particle mobility is a measure of the velocity of a toner particle in a liquid developer divided by the size of the electric field within which the liquid developer is employed. The greater the charge on a toner particle, the faster it moves through the electrical field of the development zone. The movement of the particle is important for image development and background cleaning. Toner particle mobility can be measured using the electroacoustics effect, the application of an electric field and the measurement of sound described in Oja et al. U.S. Pat. No. 4,497,208, the disclosure of which is totally incorporated herein by reference. This technique is particularly useful for nonaqueous dispersions because the measurements can be accomplished at high volume loadings, for example greater than 1 weight percent. Measurements rendered by this technique have been shown to correlate with image quality, that is for example high mobilities have been shown to result in improved image density, higher image resolution and superior transfer efficiency, for example U.S. Pat. Nos. 5,066,821, 5,034,299, and 5,028,508, the disclosures of which are totally incorporated herein by reference. Residual conductivity, that is the conductivity from the charge director, can be measured with a low field device as described in the Examples.

To increase the toner particle charge and, accordingly, increase the mobility and transfer latitude of the toner particles, the prior art selects charge adjuvants that are added to the toner particles. For example, adjuvants, such as metallic soaps, like aluminum or magnesium stearate or octoate, fine particle size oxides, such as oxides of silica, alumina, titania, and the like, paratoluene sulfonic acid, and polyphosphoric acid, may be added. Negative charge adjuvants increase the negative charge of the toner particle, while the positive charge adjuvants increase the positive charge of the toner particles. With the invention of the present application, the adjuvants or charge additive can be comprised of the metal catechol and aluminum hydroxy acid complexes illustrated in copending patent applications U.S. Ser. No. 009,202 (D/92570) now U.S. Pat. No. 5,306,591, and U.S. Ser. No. 009,192 (D/92571), now U.S. Pat. No. 5,308,731, the disclosures of which are totally incorporated herein by reference, and/or the AB diblocks of the present invention; and these additives have the following advantage over the aforementioned prior art charge additives: improved toner charging characteristics, namely, an increase in particle charge, as measured by ESA mobility, of from $-1.4$ E-10 $m^2/Vs$ to $-2.3$ E-10 $m^2/Vs$, that results in improved image development and transfer, from 80 percent to 93 percent, to allow improved solid area coverage from a transferred image reflectance density of 1.2 to 1.3. The adjuvants can be added to the liquid toner particles in an amount of from about 0.1 percent to about 15 percent of the total developer solids and preferably from about 1 percent to about 5 percent of the total weight of solids contained in the developer.

The liquid electrostatic developer of the present invention can be prepared by a variety of known processes, such as, for example, mixing, in a nonpolar liquid with the thermoplastic resin, charge director, and optional colorant in a manner that the resulting mixture contains about 15 to about 30 percent by weight of solids; heating the mixture to a temperature of from about 70° C. to about 130° C. until a uniform dispersion is formed; adding an additional amount of nonpolar liquid sufficient to decrease the total solids concentration of the developer to about 10 to about 20 percent by weight; cooling the dispersion to about 10° C. to about 50° C.; adding the charge director compound to the dispersion; and diluting the dispersion to 1 percent to 2 percent solids.

In the initial mixture, the resin, colorant and charge director may be added separately to an appropriate vessel which can vary in size from 50 milliliters to 1,000 liters such as, for example, an attritor, heated ball mill, heated vibratory mill, such as a Sweco Mill (manufactured by Sweco Company, Los Angeles, Calif.) equipped with particulate media for dispersing and grinding, a Ross double planetary mixer (manufactured by Charles Ross and Son, Hauppauge, N.Y.), or a two roll heated mill, which requires no particulate media. Useful particulate media include materials like a spherical cylinder selected from the group consisting of stainless steel, carbon steel, alumina, ceramic, zirconia, silica and sillimanite. Carbon steel particulate media are particularly useful when colorants other than black are used. A typical diameter range for the particulate media is in the range of 0.04 to 0.5 inch (approximately 1.0 to approximately 13 millimeters).

Sufficient nonpolar liquid is added to provide a dispersion of from about 15 to about 50 percent solids. This mixture is then subjected to elevated temperatures during the initial mixing procedure to plasticize and soften the resin. The mixture is sufficiently heated to provide a uniform dispersion of all the solid materials of, for example, colorant, adjuvant and resin. However, the temperature at which this step is undertaken should not be so high as to degrade the nonpolar liquid or decompose the resin or colorant if present. Accordingly, the mixture in embodiments is heated to a temperature of from about 70° C. to about 130° C., and preferably from about 75° C. to about 110° C. The mixture may be ground in a heated ball mill or heated attritor at this temperature for about 15 minutes to 5 hours, and preferably about 60 to about 180 minutes.

After grinding at the above temperatures, an additional amount of nonpolar liquid may be added to the dispersion. The amount of nonpolar liquid to be added at this point should be an amount sufficient to decrease the total solids concentration of the dispersion to about 10 to about 20 percent by weight.

The dispersion is then cooled to about 10° C. to about 50° C., and preferably to about 15° C. to about 30° C., while mixing is continued until the resin admixture solidifies or hardens. Upon cooling, the resin admixture precipitates out of the dispersant liquid. Cooling is accomplished by methods such as the use of a cooling fluid like water, glycols, such as ethylene glycol, in a jacket surrounding the the mixing vessel. Cooling is accomplished, for example, in the same vessel, such as an attritor, while simultaneously grinding with particulate media to prevent the formation of a gel or solid mass; without stirring to form a gel or solid mass, followed by shredding the gel or solid mass and grinding by means of particulate media; or with stirring to form a viscous mixture and grinding by means of particulate media. The resin precipitate is cold ground for about 1 to 36 hours, and preferably from about 2 to about 6 hours. Additional liquid may be added at any time during the preparation of the liquid developer to facilitate grinding or to dilute the developer to the appropriate percent solids needed for developing. Other processes of preparation are generally illustrated in U.S. Pat. Nos. 4,760,009; 5,017,451; 4,923,778 and 4,783,389, the disclosures of which are totally incorporated herein by reference.

Embodiments of the invention will be illustrated in the following nonlimiting Examples, it being understood that these Examples are intended to be illustrative only and that the invention is not intended to be limited to the materials, conditions, process parameters and the like recited herein. The conductivity of the liquid toner dispersions and charge director solutions were determined with a Scientifica 627 Conductivity Meter (Scientifica, Princeton, N.J.). The measurement signal for this meter is a low distortion 18 hz sine wave with an amplitude of 5.4 to 5.8 volts rms. Toner particle mobilities and zeta potentials were determined with a MBS-8000 electrokinetic sonic analysis (ESA) system (Matec Applied Science Hopkinton, Mass.). The system was calibrated in the aqueous mode per manufacturer's recommendation to provide an ESA signal corresponding to a zeta potential of −26 mv for a 10 percent (v/v) suspension of LUDOX TM (DuPont). The system was then set up for nonaqueous measurements. The toner particle mobility is dependent on a number of factors including particle charge and particle size. The ESA system also calculates the zeta potential which is directly proportional to toner charge and is independent of particle size. Particle size was measured by two methods: (1) the Malvern 3600E Particle Sizer manufactured by Malvern, Southborough, Mass. uses laser diffraction light scattering of stirred samples to determine average particle sizes; and (2) Horiba CAPA-500 centyrafugal automatic particle analyzer manufactured by Horiba Instruments, Inc, Irvine, Calif. Since the Malvern and Horiba instruments use different techniques to measure average particle size, the readings usually differ. The following correlation of the average size of toner particles in microns for the two instruments is

| VALUE DETERMINED BY MALVERN 3600E PARTICLE SIZER | EXPECTED RANGE FOR HORIBA CAPA-500 |
|---|---|
| 30 | 9.9 +/− 3.4 |
| 20 | 6.4 +/− 1.9 |
| 15 | 4.6 +/− 1.3 |
| 10 | 2.8 +/− 0.8 |
| 5 | 1.0 +/− 0.5 |
| 3 | 0.2 +/− 0.6 |

This correlation is obtained by statistical analysis of average particle sizes for known liquid developer samples obtained on both instruments. The expected range of Horiba values was determined using linear regression at a confidence level of 95 percent.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

[Preparation for 99-2]Sequential Group Transfer Polymerization (GTP) of 2-Ethylhexyl Methacrylate (EHMA) and 2-Dimethylaminoethyl Methacrylate (DMAEMA) to Prepare the AB Diblock Copolymer Precursor of Protonated Ammonium or Quaternary Ammonium Block Copolymer Charge Directors AB diblock copolymer precursors were prepared by a standard group transfer sequential polymerization procedure (GTP) wherein the ethylhexyl methacrylate monomer was first polymerized to completion and then the 2-dimethylaminoethyl methacrylate monomer was polymerized onto the living end of the ethylhexyl methacrylate polymer. All glassware was first baked out in an air convection oven at about 120° C. for about 16 to 18 hours.

In a typical procedure, a 2 liter 3-neck round bottom flask equipped with a magnetic stirring football, an argon inlet and outlet, and a neutral alumina (150 grams) column (later to be replaced by a rubber septum and then a liquid dropping funnel) is charged through the alumina column, which is maintained under a positive argon flow and sealed from the atmosphere, with 415 grams (2.093 mole) of freshly distilled 2-ethylhexyl methacrylate (EHMA) monomer. Next, 500 milliliters of freshly distilled tetrahydrofuran solvent, distilled from sodium benzophenone, is rinsed through the same alumina column into the polymerization vessel. Subsequently, the GTP initiator, 15 milliliters of methyl trimethylsilyl dimethylketene acetal (12.87 grams; 0.0738 mole) is syringed into the polymerization vessel. The acetal was originally vacuum distilled and a middle fraction was collected and stored (under argon) for polymerization initiation purposes. Stirring was accomplished for about 5 minutes at ambient temperature under a gentle argon flow (flow rate is generally not measured but is monitored by observing that bubbles of argon exit the polymerization unit through a tube containing a viscous inert liquid such as mineral oil up through the methanol quenching step which halts the polymerization). Providing a gentle positive argon flow is maintained in the polymerization unit to prevent atmosphere from entering into the polymerization unit, atmospheric impurities, such as water and oxygen, are excluded and the polymerization proceeds. Atmospheric impurities could prematurely terminate the polymerization, which may not enable the desired AB diblock copolymer flow. 0.1 Milliliter of a 0.66 molar solution of tetrabutylammonium acetate (catalyst) in the same dry tetrahydrofuran was syringed into the polymerization vessel. After an additional hour stirring under argon, the polymerization temperature peaked at about 50° C. Shortly thereafter, 90 grams (0.572 mole) of freshly distilled 2-dimethylaminoethyl methacrylate (DMAEMA) monomer were dropwise added to the polymerization vessel. The polymerization solution was stirred under argon for at least 4 hours after the temperature peaked. Then 5 milliliters of methanol were added to quench the live ends of the fully grown copolymer. The above charges of initiator and monomers provided an $M_n$ and average degree of polymerization (DP) for each block. For the EHMA nonpolar B block, the charged $M_n$ is 5,621 and the DP is 28.3, and for the DMAEMA polar A block, the charged $M_n$ is 1,219 and the DP is 7.8. $^1$H-NMR analysis of a 20 percent (g/dl) $CDCl_3$ solution of the copolymer indicated a 77 to 78 mole percent EHMA content and a 22 to 23 mole percent DMAEMA content. GPC analysis was obtained (the size of the sample isolated for GPC analysis is as illustrated herein, reference the injection description that follows, that is one can calculate the weight of the solid being placed onto the GPC column). The size of the AB diblock copolymer sample isolated in the solid state, that is freed from solvent, is considered unimportant providing that it is sufficiently large enough to accomplish the analysis fraction of the 1 to 2 gram sample of isolated polymer) using three 250×8 millimeter PHENOMENEX PHENOGEL TM columns in series (100, 500, 1,000 Angstroms) onto which was injected a 10 microliter sample of the block copolymer at 1 percent (weight/volume) in THF. The sample was eluted with THF at a flow rate of 1 milliliter/minute and the chromatogram was detected with a 254 nanometer UV detector. The GPC chromatogram was bimodal with the major peak occurring at 13.4 to 22.2 counts and the minor low molecular weight peak at 23.5 to 28.3 counts. The major peak has a polystyrene equivalent number average molecular weight ($M_n$) of 2,346 and a weight average molecular weight ($M_w$) of 8,398 (MWD=3.58). This GPC analysis of the AB diblock copolymer suggests the presence of low molecular weight oligomeric impurities. The low molecular weight GPC peak components do not appear to impair the charge director function of the subsequently prepared protonated ammonium AB diblock copolymer charge director of the present invention.

A small (1 to 2 grams) portion of the AB diblock copolymer can be isolated for GPC and $^1$H-NMR analyses by precipitation into 10 times its solution volume of methanol using vigorous mechanical agitation. The precipitated copolymer was then washed on the funnel with more methanol and was then dried overnight in vacuo (about 0.5 Torr) at about 50° C.

The AB diblock copolymer prepared above was not isolated but instead was solvent exchanged to provide a copolymer solution in toluene. Typically, the methanol quenched copolymer solution in tetrahydrofuran was rotoevaporated at about 50° C. at reduced pressure (40 to 50 millimeters Hg) in a weighed round bottom flask until no more solvent distilled over. Then, toluene was added to provide about a 50 percent by weight solution of the unprotonated block copolymer.

EXAMPLE II

[Preparation For 99-1]

A second AB diblock copolymer was prepared as described in Example I using the same polymerization procedure, conditions, and quantities of the same materials except that more ketene acetal was used to initiate this GTP. In this preparation, 26 milliliters of the ketene acetal (22.31 grams; 0.1280 mole) were used to initiate the polymerization. The above monomer charges are equivalent to 78.5 mole percent of EHMA and 21.5 mole percent of DMAEMA which corresponds to an EHMA average DP of 16.4 ($M_n$ of 3,243) and a DMAEMA average DP of 4.5 ($M_n$ of 703). After solvent exchange as described above, a 1 to 2 gram sample of the AB diblock copolymer was isolated by evaporating the toluene in a vacuum oven overnight at about 55° C. and 0.5 Torr, and the dried AB diblock copolymer was next sampled for $^1$H-NMR analysis. $^1$H-NMR analysis of a 20 percent (gram/dl) $CDCl_3$ solution of the AB diblock copolymer indicated about a 79 to 80 mole percent of EHMA repeat unit content and a 20 to 21 mole percent of DMAEMA repeat unit content. GPC analysis, as described in Example I, indicated the major peak at 14.5 to 19.9 counts to have a number average molecular weight of 3,912 and a weight average molecular weight of 6,222 (MWD of 1.59). Two barely discernible broad low molecular weight peaks were located at 20 to 25.1 and 25.1 to 30 counts.

EXAMPLE III

[Preparation For 19-1]

A third AB diblock copolymer was prepared as described in Example II using the same polymerization procedure and conditions except the polymerization scale was increased by a factor of three. $^1$H-NMR analysis of a 17.5 percent (gram/dl) $CDCl_3$ solution of an isolated portion of the unprotonated block copolymer indicated about a 77 to 78 mole percent of EHMA repeat unit content and a 22 to 23 mole percent of DMAEMA repeat unit content. GPC analysis, as described in Example I, indicated the major peak at 14.4 to 22.6 counts to have a number average molecular weight of 2,253 and a weight average molecular weight of 5,978 (MWD of 2.65). A broad low molecular weight peak was located at 24 to 32 counts.

EXAMPLE IV

[Charge Director 25940-94-1 of the HBr Quat From 99-1 Pre-quat]

To 2.00 grams of solid AB diblock copolymer, prepared as described in Example II, in a 50 milliliter Erlenmeyer flask were added about 25 milliliters of toluene. The 2.00 grams of unprotonated block copolymer, at 16.9 weight percent of DMAEMA repeat units, contains 0.00214 mole of DMAEMA repeat units. To the resulting toluene solution, which was magnetically stirred at room temperature, was added 0.351 gram of a 48 weight percent aqueous HBr solution, which is 0.00208 mole of HBr. The HBr aqueous solution was rinsed into the reaction flask with about 8 milliliters of methanol to provide a clear solution of reactants. Thus, the charged mole percent ratio of HBr to DMAEMA repeat units was 97 percent so that nearly all of the DMAEMA repeat units have been targeted for conversion to the HBr protonated charge director. After stirring the solution for about 17 hours at ambient conditions, the protonated ammonium bromide AB diblock copolymer charge director solution was diluted with 198 grams of NORPAR 15 TM and the NORPAR 15 TM solution was rotoevaporated at 50° to 60° C. for 1 to 1.5 hours at 40 to 60 millimeters Hg to remove the low boiling methanol and toluene.

EXAMPLE V

[Charge Director 25940-94-2 the HBr Quat From 99-2]

Using the procedure described in Example IV, another HBr protonated ammonium bromide AB diblock copolymer NORPAR 15 TM (1 percent) charge director solution was prepared starting with the unprotonated block copolymer prepared in Example I.

EXAMPLE VI

[HBr Protonated Quat Director Series at Different Levels of Charged Protonation, All From 19-1]

To ten 25 milliliter Erlenmeyer flasks were charged 3.93 grams of the AB diblock copolymer prepared as described in Example III. At 50.86 weight percent of solids, the AB diblock copolymer content was 2.00 grams. $^1$H-NMR indicated the AB diblock copolymer to be 21.95 mole percent or 18.23 weight percent of DMAEMA repeat units. The 2.00 grams of AB diblock copolymer contains 0.3646 gram (0.0023 mole) of DMAEMA repeat units. To each of these flasks was then charged the amount of 48 percent aqueous HBr indicated in the following table. [After the HBr reaction is complete (probably about 3 hours at ambient conditions), the starting AB diblock copolymer becomes a protonated ammonium bromide AB diblock copolymer charge director.]

| Charge Director No. | Grams 48% Aq. HBr Soln. | Grams HBr | Moles HBr | Molar Ratio HBr/DMAEMA |
|---|---|---|---|---|
| 1 | 0.3118 | 0.1497 | 0.00185 | 0.804 |
| 2 | 0.3356 | 0.1611 | 0.00199 | 0.865 |
| 3 | 0.3525 | 0.1692 | 0.00209 | 0.909 |
| 4 | 0.3714 | 0.1783 | 0.00220 | 0.957 |
| 5 | 0.3790 | 0.1819 | 0.00225 | 0.978 |
| 6 | 0.3917 | 0.1880 | 0.00232 | 1.009 |
| 7 | 0.3988 | 0.1914 | 0.00237 | 1.030 |
| 8 | 0.4103 | 0.1969 | 0.00243 | 1.057 |
| 9 | 0.4297 | 0.2063 | 0.00255 | 1.109 |
| 10 | 0.4707 | 0.2257 | 0.00279 | 1.213 |

Both the AB diblock copolymer and the 48 percent aqueous HBr solution were weighed on an analytical balance. The AB diblock copolymer was weighed directly into the Erlenmeyer flask, and the aqueous HBr was weighed into a 10 milliliters beaker and was then transferred to the flask. The aqueous HBr transfer was quantitative because the beaker was thoroughly rinsed each time with about 10 milliliters of toluene and then 5 milliliters of methanol. The resulting solutions were magnetically agitated in stoppered flasks overnight (16 to 18 hrs.) at ambient temperature. Each sample was next rotoevaporated for 0.75 to 1.0 hour at 50° to 60° C. (40 to 50 millimeters Hg) to remove the low boiling methanol and toluene solvents, and then the samples were each diluted with 198 grams of NORPAR 15 TM to afford the 1 percent of protonated ammonium bromide AB diblock copolymer charge director solutions. The resulting visually clear charge director solution in NORPAR 15 TM (1 weight percent) was used as is to charge NORPAR 15 TM toner formulations as follows.

EXAMPLE VII

[p-TSA Quat Charge Director Prepared 25940-48-5 From 99-2 Pre-quat]

To a 50 milliliter Erlenmeyer flask were added 12.24 grams of the AB diblock copolymer toluene solution (49 weight percent of solids) prepared as described in Example I. This solution contained 6.0 grams of AB diblock copolymer. The AB diblock copolymer in this solution was found to contain 19.5 weight percent of DMAEMA repeat units ($^1$H-NMR) which amounts to 1.17 grams or 0.00744 mole of DMAEMA repeat units. To this solution were added 1.39 grams of p-toluene sulfonic acid monohydrate (p-TSA) (0.00722 mole) which was rinsed into the flask with 2 to 3 milliliters of methanol and 7 to 8 milliliters of toluene. The charged mole percent ratio of p-TSA to DMAEMA repeat units was 97 percent so that nearly all of the DMAEMA repeat units have been targeted for conversion to the p-TSA protonated charge director. After magnetically stirring for 2 to 3 hours at ambient temperature, the solution was mixed with 587.8 grams of NORPAR 15 TM and the resulting cloudy mixture was rotoevaporated at 40 to 50 millimeters Hg at 40° to 45° C. for 1 hour to remove the low boiling methanol and toluene solvents.

CONTROL 1

[Prepared of the Methyl Bromide Quat 26242-16 From 99-1 Pre-quat]

To a 250 milliliter single neck round bottom flask were added 75 grams of a toluene solution of the AB diblock copolymer prepared as described in Example II. The toluene solution (21.37 weight percent of solids) contained 16.03 grams of AB diblock copolymer. The AB diblock copolymer contained 16.9 weight percent of DMAEMA repeat units or 2.71 grams (0.0172 mole) as determined from the $^1$H-NMR analysis. To this magnetically stirred AB diblock copolymer solution at ambient temperature were added 9.0 milliliters (0.0180 mole) of a 2.0 molar solution of methyl bromide in methyl t-butyl ether. The charged mole percent ratio of methyl bromide to DMAEMA repeat units is 104 percent thus all of the DMAEMA repeat units have been targeted for conversion to the methyl bromide alkylated charge director. After magnetically stirring the copolymer-methyl bromide solution overnight (23 hours) in the stoppered flask at ambient temperature, an increase in viscosity was observed (viscosity was visually observed by swirling the flask or magnetically stirring the solution). Both nitrogen protonation and quaternization generally cause an observable viscosity increase. The solution was rotoevaporated to dryness at 50° to 60° C. (40 to 50 millimeters Hg) in about 1 hour. The polymeric solid was further dried overnight at 50° to 60° C. in the vacuum oven (0.5 millimeter Hg). $^1$H-NMR analysis indicated no unquaternized nitrogen dimethyl signal implying little or no free DMAEMA to be present in the methyl bromide quaternized ammonium AB diblock copolymer. A fraction of the polymeric solid (14.5 grams) charge director was diluted with NORPAR 15 TM to prepare the charge director solution as follows. To 2.21 grams of the solid polymeric residue (equivalent to 2.00 grams of the Example II AB diblock copolymer) was added 198 grams of NORPAR 15 TM at ambient conditions with magnetic stirring.

CONTROL 2

[Prepared of the Methyl Tosylate Quat 25940-45 From 99-2 Pre-quat and Subsequent Dilution Thereof After Ambient Storage]

To a 500 milliliter 4 neck round bottom flask equipped with a mechanical stirrer, an argon inlet and outlet on top of a water condenser, and a thermometer was charged 204.1 grams of the AB diblock copolymer toluene solution, prepared as described in Example I, and 110 grams of additional toluene solvent. This solution contains about 100 grams (49 weight percent of solids) of block copolymer of which 19.15 grams (0.1218 mole) are DMAEMA repeat units as determined by $^1$H-NMR. To this vigorously stirred solution at ambient temperature, about 25° C. throughout, unless otherwise noted, and under a gentle argon flow were added in one portion 20.4 grams (0.1096 mole) of methyl p-toluene sulfonate. The charged mole percent ratio of methyl p-toluene sulfonate to DMAEMA repeat units is 90 percent, thus nearly all of the DMAEMA repeat units have been targeted for conversion to the methyl p-toluene sulfonate quaternary ammonium AB diblock charge director. After about 1 hour, the internal temperature gently exothermed from 20° C. to 27° C. and then began to drop. After about 2 hours after the addition of the methyl p-toluene sulfonate, a heating mantle (set at 25 volts) was applied to the reaction vessel. An internal temperature of about 55° C. was maintained for the next 24 hours. A small aliquot (2.20 grams) of the methyl p-toluene sulfonate quaternary ammonium AB diblock charge director toluene solution was concentrated in the vacuum oven (50° to 55° C. for 28 hours at about 0.5 millimeter Hg) giving 0.78 gram of solid and establishing the solids level at 35.45 weight percent. To 6.79 grams of the 35.45 weight percent of methyl p-toluene sulfonate quaternary ammonium AB diblock charge director solution was added 198 grams of NORPAR 15 TM and the mixture was roto-evaporated for about 1 hour at 50° to 60° C. at 40 to 60 millimeters Hg to remove the toluene.

EXAMPLE VIII 211.3 Grams of NUCREL 599® (a copolymer of ethylene and methacrylic acid with a melt index at 190° C. of 500 available from E. I. DuPont de Nemours & Company, Wilmington, Del.), 11.4 grams of the magenta pigment (FANAL PINK TM), 4.5 grams of aluminum stearate, WITCO 22 TM (Witco Chemical Corporation, New York, N.Y.), and 1,287.5 grams of NORPAR 15 TM (Exxon Corporation) are added to a Union Process 1S attritor (Union Process Company, Akron, Ohio) charged with 0.1857 inch (4.76 millimeters) diameter carbon steel balls. The mixture was milled in the attritor which was heated with running steam through the attritor jacket at 60° to 94° C. for 2 hours and cooled by running water through the attritor jacket to 18° C. and ground in the attritor for an additional 3.75 hours. Additional (a total of 1,557 grams) NORPAR 15 TM was added and the mixture was separated from the steel balls yielding a toner concentrate of 6.9 percent solids. Particle size determined with the Horiba Cappa 500 Particle size analyzer was found to be 1.84 microns.

EXAMPLE IX 172.7 Grams of NUCREL 599® (a copolymer of ethylene and methacrylic acid with a melt index at 190° C. of 500 available from E. I. DuPont de Nemours & Company, Wilmington, Del.), 50 grams of the magenta pigment (FANAL PINK TM), 4.5 grams of aluminum stearate, WITCO 22 TM (Witco Chemical Corporation, New York, N.Y.), and 1,287.5 grams of NORPAR 15 TM (Exxon Corporation) were added to a Union Process 1S attritor (Union Process Company, Akron, Ohio) charged with 0.1857 inch (4.76 millimeters) diameter carbon steel balls. The mixture was milled in the attritor which was heated with running steam through the attritor jacket at 75° to 85° C. for 2 hours and cooled by running water through the attritor jacket to 15° C. and ground in the attritor for an additional 4.5 hours. Additional (a total of 1,557 grams) NORPAR 15® was added and the mixture was separated from the steel balls yielding a toner concentrate of 7.0 percent solids. Particle size determined with the Horiba Cappa 500 Particle size analyzer was found to be 1.44 microns average diameter by area.

EXAMPLE X 165.3 Grams of NUCREL 599® (a copolymer of ethylene and methacrylic acid with a melt index at 190° C. of 500 available from E. I. DuPont de Nemours & Company, Wilmington, Del.), 56.8 grams of the magenta pigment (FANAL PINK TM), 5.1 grams of aluminum stearate, WITCO 22 TM (Witco Chemical Corporation, New York, N.Y.), and 307 grams of NORPAR 15 TM (Exxon Corporation) were added to a Union Process 1S attritor (Union Process Company, Akron, Ohio) charged with 0.1857 inch (4.76 millimeters) diameter carbon steel balls. The mixture was milled in the attritor which was heated with running steam through the attritor jacket at 87° to 92° C. for 2 hours, the 980.1 grams of additional NORPAR 15 TM (Exxon Corporation) were added, and the mixture was cooled by running water through the attritor jacket to 23° C. and ground in the attritor for an additional 4.5 hours. Additional (a total of 1,512 grams) NORPAR 15 TM was added and the mixture was separated from the steel balls yielding a toner concentrate of 7.0 percent solids. Particle size determined with the Horiba Cappa 500 Particle size analyzer was found to be 2.02 microns average diameter by area.

CONTROL 3

200 Grams of 1 percent solids (by weight) of a toner dispersion were prepared by diluting a portion of the toner concentrate of Example IX with NORPAR 15 TM. To this dispersion 120 milligrams of BASIC BARIUM PETRONATE TM (Witco) were added. The ESA mobility of this toner was measured after 16 days providing a value of −1.30 E-10 $m^2/Vs$.

EXAMPLE XI

200 Grams of 1 percent solids (by weight) of a toner dispersion were prepared by diluting a portion of the toner concentrate of Example IX with NORPAR 15 TM. To this 120 milligrams of solids of the ammonium bromide, AB diblock charge director of Example IV was added. The ESA mobility of this toner was measured after 16 days providing a value of −1.89 E-10 $m^2/Vs$ demonstrating that the ammonium bromide AB diblock charge director was more effective than BASIC BARIUM PETRONATE TM (Control 3). The greater mobility is expected to result in improved performance with better resolution and transfer efficiency. While specific results depend on the imaging system used, it is expected that this difference in mobility would result in an improvement in resolved line pairs by at least 1 line pair/millimeter and that transfer efficiency will improve by 5 percent.

CONTROL 4

200 Grams of 1 percent solids (by weight) of a toner dispersion were prepared by diluting a portion of the toner concentrate of Example VIII with NORPAR 15 TM. To this 120 milligrams of solids of the methyl tosylate quaternary ammonium, AB diblock charge director of Control 2 was added. The ESA mobility of this toner was measured after 135 days giving a value of −2.76 E-10 $m^2/Vs$. To test the impact of the addition of an excess of charge director, 120 milligrams additional Control 2 charge director were added which resulted in an immediate large decrease in ESA mobility to −0.80 E-10 $m^2/Vs$. The sample equilibrated to a value of −1.69 E-10 $m^2/Vs$ after 0.7 hour.

EXAMPLE XII

200 Grams of 1 percent solids (by weight) of a toner dispersion were prepared by diluting a portion of the toner concentrate of Example VIII with NORPAR 15 TM. To this were added 120 milligrams of solids of the ammonium tosylate AB diblock charge director of Example VII. The ESA mobility of this toner was measured after 135 days giving a value of −3.10 E-10 $m^2/Vs$. To test the impact of the addition of an excess of charge director, 120 milligrams additional Example VII charge director were added which resulted in an immediate slight decrease in ESA mobility to −2.67 E-10 $m^2/Vs$. The sample equilibrated to a value of −2.76 E-10 $m^2/Vs$ after 0.7 hour. This demonstrates that the ammonium charge director of Example VII is superior to the quaternary ammonium charge director of Control 2 (see Control 4) both for the mobility achieved with the initial addition of charge director and for maintaining a high mobility value upon the addition of excess charge director. The decrease in mobility obtained by the addition of Control 2 charge director could result in complete toner failure meaning the toner will not develop and/or transfer.

CONTROL 5

Nine 200 gram samples of 1 percent solids (by weight) of a toner dispersion were prepared by diluting a portion of the toner concentrate of Example X with NORPAR 15 TM. To these 0, 20, 30, 60, 100, 140, 200, 260, and 320 milligrams of the charge director solids of Control 1 (methyl bromide quaternary ammonium AB diblock copolymer) charge director were added. The ESA mobility of these toner samples were measured after 14 days and the results are shown in the Table below.

EXAMPLE XIII

Nine 200 gram samples of 1 percent solids (by weight) of a toner dispersion were prepared by diluting a portion of the toner concentrate of Example X with NORPAR 15 TM. To these 0, 20, 30, 60, 100, 140, 200, 260, and 320 milligrams of the charge director solids of Example IV (ammonium bromide AB diblock copolymer) charge director were added. The ESA mobility of these toner samples was measured after 14 days and the results are shown in the Table below. This demonstrates that the charge director of Example IV is superior to the charge director of Control 1 because of the higher mobility achieved at low charge director levels (60 milligrams of CD added). Thus, for example, less of the charge director of Example IV compared to the charge director of Control 1 is required to obtain particle charges needed to develop images and transfer them to a substrate. Although imaging results vary with the imaging system used, it is expected that the low mobility obtained with Control 1 charge director at the 30 milligrams/gram level (−0.80 $m^2/Vs$) would transfer less than 50 percent of the developed image.

| mg Charge Director | Charge Director Level (mg CD/g toner solids) | Control 5 ESA Mobility E-10 $m^2/Vs$ | Example XIII ESA Mobility E-10 $m^2/Vs$ |
|---|---|---|---|
| 0 | 0 | −0.24 | −0.42 |
| 20 | 10 | −0.33 | −0.34 |
| 60 | 30 | −0.80 | −2.37 |
| 100 | 50 | −3.22 | −3.35 |
| 140 | 70 | −3.07 | −3.24 |
| 200 | 100 | −2.75 | −3.17 |
| 260 | 130 | −2.94 | −2.62 |
| 320 | 160 | −2.91 | −2.76 |

EXAMPLE XIV

To 27.8 grams (7.19 weight percent solids) of a magenta toner dispersion of Example X containing 2.0 grams of toner solids was added 12 grams (60 milligrams/1.0 gram of toner solids) each of the 1 percent ammonium bromide AB diblock copolymer charge directors in NORPAR 15 TM of Example VI and 160.2 grams of NORPAR 15 TM diluent. The resulting liquid ink developers all contained 1 weight percent toner solids and were aged for the time indicated in the Table that follows prior to ESA mobility testing. This Example demonstrates the importance of neutralization level for the performance of the ammonium AB diblock charge director. Although imaging results vary with the imaging system used, it is expected that the low mobility obtained with insufficient neutralization will result in low resolution images (less 1 line pair/millimeter) and lower transfer efficiency (less by 5 percent).

| Molar Ratio HBr/ DMAEMA | Single Point ESA Mobility E-10 $m^2/Vs$ (Conductivity, ps/cm) [Time] | Single Point ESA Mobility E-10 $m^2/Vs$ (Conductivity, ps/cm) [Time] |
|---|---|---|
| 0.804 | −2.11 (3) [23 days] | −1.80 (3) [39 days] |
| 0.865 | −2.84 (7) [23 days] | −2.64 (6) [39 days] |
| 0.909 | −2.87 (8) [23 days] | −2.63 (7) [39 days] |
| 0.957 | −2.87 (11) [23 days] | −2.90 (10) [39 days] |
| 0.978 | −2.97 (10) [23 days] | −2.75 (9) [39 days] |
| 1.009 | −2.93 (11) [23 days] | −2.96 (11) [39 days] |
| 1.030 | −2.84 (10) [23 days] | −3.11 (10) [39 days] |
| 1.057 | −2.82 (9) [23 days] | −2.99 (9) [39 days] |
| 1.109 | −2.72 (11) [23 days] | −3.01 (11) [39 days] |
| 1.213 | −2.57 (11) [23 days] | −2.78 (10) [39 days] |

EXAMPLE XV

The liquid toners of Control 3 and Example XI were tested for deposition efficiency onto a VITON® substrate.

A belt with the overcoating was comprised of VITON B-50®, a fluoropolymer comprised of a copolymer of vinylidene fluoride, hexafluoropropylene, and tetrafluoroethylene, with a mole ratio of 61:17:22 ( E. I. DuPont).

A solution of VITON B-50® was prepared by dissolving 250 grams of the B-50® in 2.5 liters of methylethyl ketone by stirring at about 25° C. To 2 liters of this solution there were added in a reaction vessel 2.2 grams of magnesium oxide, 1.1 grams of calcium hydroxide, 5.5 grams of CURATIVE VC-50® (E. I. DuPont) and 5 grams of carbon black N991 TM (Cabot Labs). The contents of the vessel were ball milled with media for 17 hours. The resulting black dispersion was then spray coated onto a stainless steel primed belt. The coating was then cured by heating for 2 hours at 93° C., 2 hours at 149° C., 2 hours at 177° C., and thereafter heating for 16 hours at 208° C., followed by cooling to room temperature. The cured thickness of the overcoat was approximately 4 mils.

The toners were placed in a test cell which consisted of a metal cup electrode with a depth of 1 millimeter which will hold 1 milliliter of liquid toner and a covering electrode. The cell was powered by a Trek 610 power supply. The amount of toner deposited onto the covering electrode, which was metal or VITON® coated metal, was determined by depositing the toner that remained in the cup onto paper and comparing the reflectance density of that toner deposit to the reflectance density of a deposit that was produced by all of the toner in the cup. The latter measurement was made by refilling the cup with liquid toner and depositing the entire volume of toner onto paper with a metal electrode backing. The test was run for various times and electric fields. The results are shown in the Table that follows.

| | % Toner | % Toner |
|---|---|---|

-continued

| Time (sec) | Electric Field (KV/mm) | Deposition onto VITON B-50 Coated Metal Electrode Control 3 (BASIC BARIUM PETRONATE) | Deposition onto VITON B-50 Coated Metal Electrode Example XI (HBr-Ammonium Diblock) |
|---|---|---|---|
| 2 | 1 | 65% | 98% |
| 2 | 6 | 0% | 85% |
| 10 | 1 | 0% | 90% |
| 10 | 6 | 0% | 100% |

CONTROL 6

To a 250 milliliter single neck round-bottom flask were added 31.52 grams of a toluene solution of the AB diblock copolymer prepared as described in Example III. The toluene solution (50.86 weight percent solids) contained 16.03 grams of AB diblock copolymer. The AB diblock copolymer contained 19.0 weight percent of DMAEMA repeat units or 3.05 grams (0.0194 mole) as determined from $^1$H-NMR analysis. To this magnetically stirred AB diblock copolymer solution at ambient temperature were added 10.70 milliliters (0.0213 mole) of a 2.0 molar solution of methyl bromide in methyl t-butyl ether. The charged mole percent ratio of methyl bromide to DMAEMA repeat units is 110 percent so all of the DMAEMA repeat units have been targeted for conversion to the methyl bromide quaternary ammonium AB diblock copolymer charge director. After magnetically stirring the solution overnight (22 hours) at ambient conditions, the solution was rotoevaporated (0.3 hour at 50° to 60° C. at 40 to 50 millimeters Hg) to about half its volume in order to remove any excess methyl bromide, and then 304.6 grams of NORPAR 15 TM were added and the solution was further rotoevaporated for about 1 hour at the same conditions. The resulting NORPAR 15 TM methyl bromide quaternary ammonium AB diblock copolymer charge director (5 weight percent) was used as is to charge NORPAR 15 TM toner formulations.

EXAMPLE XVI

To a 50 milliliter Erlenmeyer flask were added 7.86 grams of a 50.86 weight percent toluene solution of AB diblock copolymer prepared as described in Example III. The 4.00 grams of AB diblock copolymer in the above toluene solution, at 18.23 weight percent of DMAEMA repeat units, contain 0.00464 mole of DMAEMA repeat units. To this magnetically stirred solution at room temperature was added 0.76 gram of a 48 weight percent aqueous HBr solution, which is 0.0045 mole of HBr. The aqueous HBr solution was rinsed into the flask with methanol. The charged mole percent ratio of HBr to DMAEMA repeat units is 97 percent so that nearly all of the DMAEMA repeat units have been targeted for conversion to the ammonium bromide AB diblock copolymer charge director. After stirring overnight (16 to 18 hours) at ambient conditions in the stoppered Erlenmeyer flask, the reaction solution was mixed with 396 grams of NORPAR 15 TM and was rotoevaporated at 60° to 65° C. (40 to 60 millimeters Hg) for 1.5 hours to remove the low boiling methanol and toluene. The resulting NORPAR 15 TM ammonium bromide AB diblock copolymer charge director (1 weight percent) was used as is to charge NORPAR 15 TM toner formulations.

EXAMPLE XVII 170.4 Grams of NUCREL 599® (a copolymer of ethylene and methacrylic acid with a melt index at 190° C. of 500 available from E. I. DuPont de Nemours & Company, Wilmington, Del.), 50.0 grams of the magenta pigment (FANAL PINK TM), 6.8 grams of aluminum stearate, WITCO 22 TM, (Witco Chemical Corporation, New York, N.Y.), and 307.4 grams of NORPAR 15 TM (Exxon Corporation) were added to a Union Process 1S attritor (Union Process Company, Akron, Ohio) and charged with 0.1857 inch (4.76 millimeters) diameter carbon steel balls. The mixture was milled in the attritor, which was heated with running steam through the attritor jacket at 87° to 92° C. for 2 hours, the 980.1 grams of additional NORPAR 15 TM (Exxon Corporation) were added and the mixture was cooled by running water through the attritor jacket to 17° C. and ground in the attritor for an additional 4.5 hours. Additional (a total of 1,512 grams) NORPAR 15 TM was added and the mixture was separated from the steel balls yielding a toner concentrate of 7.18 percent solids. Particle size determined with the Horiba Cappa 500 Particle size analyzer was found to be 1.74 microns.

This liquid toner was diluted with NORPAR 15 TM to 1 percent solids and charged with the charge director as indicated in the Table below providing 1,500 grams of 1 percent solids toner charged to a 60 milligrams (of charge director) to 1 gram (of toner) level.

| Grams Example XVII (7.18% Solids) Concentrate | Grams NORPAR 15 | Charge Director (% Solids) | Grams Charge Director |
|---|---|---|---|
| 208.9 | 1,276.1 | BASIC BARIUM PETRONATE (10%) | 15.0 |
| 208.9 | 1,201.1 | Ammonium Bromide Diblock Example XVI (1%) | 90.0 |
| 208.9 | 1,273.1 | MeBr Quat Diblock Control 6 (5%) | 18.0 |

These sample toners were tested for ESA mobility and print tested (5 to 10 prints were made in each case) with a Savin 870 office copier. Solid area density was measured with a Macbeth 918 densitometer, resolution was determined by examining line pairs resolved through a 10 power glass, and toner transfer efficiency was measured by comparing the amount of toner which is transferred to the substrate from the latent imaging element, usually a photoconductor which can be a Se alloy type like that used in the Savin 870 copier or an organic type, relative to the total amount of toner developed onto the latent imaging element. This was accomplished by removing the nontransferred toner from the latent imaging element using transparent tape and measuring its solid area density. This measurement is used in combination with the solid area density of the transferred toner to calculate transfer efficiency which is a relative measurement of toner transfer from the imaging element to the substrate. The results are shown in the Table below.

| Charge Director | ESA Mobility E-10 $m^2/Vs$ | Solid Area Density | Resolution lp/mm | Transfer Efficiency |
|---|---|---|---|---|
| Control 6 | −0.16 | 0.06 | 0 | 15% |
| Example XVI | −2.20 | 1.11 | 8.5 | 79% |
| BASIC BARIUM PETRO-NATE | −2.25 | 1.01 | 7.0 | 79% |

EXAMPLE XVIII

175 Grams of NUCREL 599 ® (a copolymer of ethylene and methacrylic acid with a melt index at 190° C. of 500 available from E. I. DuPont de Nemours & Company, Wilmington, Del.), 45.4 grams of the cyan pigment (PV FAST BLUE TM), 6.8 grams of aluminum stearate, WITCO 22, (Witco Chemical Corporation, New York, N.Y.), and 307.4 grams of NORPAR 15 ® (Exxon Corporation) are added to a Union Process 1S attritor (Union Process Company, Akron, Ohio) charged with 0.1857 inch (4.76 millimeters) diameter carbon steel balls. The mixture was milled in the attritor, which was heated with running steam through the attritor jacket at 86° to 92° C. for 2 hours, the 980.1 grams of additional NORPAR 15 TM (Exxon Corporation) were added, and the mixture was cooled by running water through the attritor jacket to 18° C. and ground in the attritor for an additional 4.5 hours. Additional (a total of 1,512 grams) NORPAR 15 TM was added and the mixture was separated from the steel balls yielding a toner concentrate of 7.27 percent solids. Particle size determined with the Horiba Cappa 500 Particle size analyzer was found to be 1.77 microns.

This liquid toner was diluted with NORPAR 15 TM to 1 percent solids and charged with charge director as indicated in the Table below providing 1,500 grams of 1 percent solids toner charged to a 60 milligrams (of charge director) to 1 gram (of toner) level.

| Grams Example XVIII (7.27% Solids) Concentrate | Grams NORPAR 15 | Charge Director (% Solids) | Grams Charge Director |
|---|---|---|---|
| 206.3 | 1,278.7 | BASIC BARIUM PETRONATE (10%) | 15.0 |
| 206.3 | 1,203.7 | Ammonium Bromide Diblock Example XVI (1%) | 90.0 |
| 206.3 | 1,275.7 | MeBr Quat Diblock Control 6 (5%) | 18.0 |

These sample toners were tested for ESA mobility and print tested (5 to 10 prints were made in each case) with a Savin 870 office copier. Solid area density was measured with a Macbeth 918 densitometer, resolution was determined by examining line pairs resolved through a 10 power glass, and toner transfer efficiency was measured by comparing the amount of toner which is transferred to the substrate from the latent imaging element, usually a photoconductor, relative to the total amount of toner developed onto the latent imaging element. This was accomplished by removing the non-transferred toner from the latent imaging element using transparent tape and measuring its solid area density. This measurement is used in combination with the solid area density of the transferred toner to calculate transfer efficiency which is a relative measurement of toner transfer from the imaging element to the substrate.

The results are shown in the Table below.

| Charge Director | ESA Mobility E-10 $m^2/Vs$ | Solid Area Density | Resolution lp/mm | Transfer Efficiency |
|---|---|---|---|---|
| Control 6 | −0.13 | 0.01 | 0 | 17% |
| Example XVI | −2.19 | 1.11 | 6.0 | 82% |
| BASIC BARIUM PETRO-NATE | −1.68 | 0.92 | 5.0 | 92% |

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A liquid developer comprised of thermoplastic resin particles, and a charge director comprised of an ammonium AB diblock copolymer of the formula

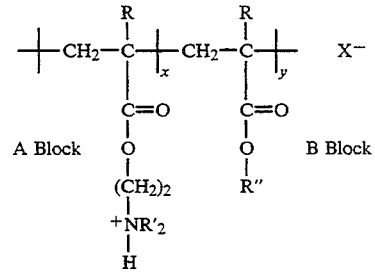

wherein $X^-$ is a conjugate base or anion of a strong acid, R is hydrogen or alkyl, R′ is alkyl, R″ is an alkyl group containing from about 6 to about 20 carbon atoms, and y and x represent the number average degree of polymerization (DP) wherein the ratio of y to x is in the range of from about 10 to 2 to about 100 to 20.

2. A liquid developer comprised of a liquid component, thermoplastic resin, and a charge director comprised of (1) a protonated AB diblock copolymer of poly[2-dimethylammoniumethyl methacrylate bromide co-2-ethylhexyl methacrylate], poly[2-dimethylammoniumethyl methacrylate tosylate co-2-ethylhexyl methacrylate], poly[2-dimethylammoniumethyl methacrylate chloride co-2-ethylhexyl methacrylate], poly[2-dimethylammoniumethyl methacrylate bromide co-2-ethylhexyl acrylate], poly[2-dimethylammoniumethyl acrylate bromide co-2-ethylhexyl methacrylate], poly[2-dimethylammoniumethyl acrylate bromide co-2-ethylhexyl acrylate], poly[2-dimethylammoniumethyl methacrylate tosylate co-2-ethylhexyl acrylate], poly[2-dimethylammoniumethyl acrylate tosylate co-2-ethylhexyl acrylate], poly[2-dimethylammoniumethyl methacrylate chloride co-2-ethylhexyl acrylate], poly[2-dimethylammoniumethyl acrylate chloride co-2-ethylhexyl acrylate], poly[2-dimethylammoniumethyl methacrylate bromide co-N,N-dibutyl methacrylamide], poly[2-dimethylammoniumethyl methacrylate tosylate co-N,N-dibutyl methacrylamide], poly[2-dimethylammoniumethyl methacrylate bromide co-N,N-dibutylacrylamide], or poly[2-dimethylammoniumethyl methacrylate tosylate co-N,N-dibutylacrylamide], and an optional charge adjuvant.

3. A liquid electrostatographic developer comprised of (A) a liquid with a viscosity of from about 0.5 to about 20 centipoise and resistivity greater than or equal to $5\times10^9$; (B) thermoplastic resin particles with an average volume particle diameter of from about 0.1 to about 30 microns; (C) a charge director comprised of a protonated AB diblock copolymer of the formula

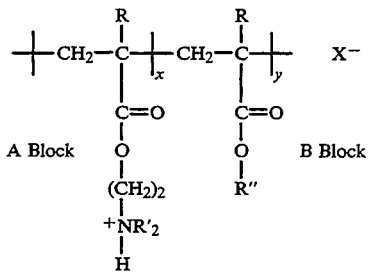

wherein X− is a conjugate base or anion of a strong acid, R is hydrogen or alkyl, R′ is alkyl, R″ is an alkyl group containing from about 6 to about 20 carbon atoms, and y and x represent the number average degree of polymerization (DP) wherein the ratio of y to x is in the range of from about 10 to 2 to about 100 to 20; and (D) an optional charge adjuvant.

4. A developer in accordance with claim 1 wherein the charge director is comprised of a protonated AB diblock copolymer of poly[2-dimethylammoniumethyl methacrylate bromide co-2-ethylhexyl methacrylate], poly[2-dimethylammoniumethyl methacrylate tosylate co-2-ethylhexyl methacrylate], poly[2-dimethylammoniumethyl methacrylate chloride co-2-ethylhexyl methacrylate], poly[2-dimethylammoniumethyl methacrylate bromide co-2-ethylhexyl acrylate], poly[2-dimethylammoniumethyl acrylate bromide co-2-ethylhexyl methacrylate], poly[2-dimethylammoniumethyl acrylate bromide co-2-ethylhexyl acrylate], poly[2-dimethylammoniumethyl methacrylate tosylate co-2-ethylhexyl acrylate], poly[2-dimethylammoniumethyl acrylate tosylate co-2-ethylhexyl acrylate], poly[2-dimethylammoniumethyl methacrylate chloride co-2-ethylhexyl acrylate], poly[2-dimethylammoniumethyl acrylate chloride co 2-ethylhexyl acrylate], poly[2-dimethylammoniumethyl methacrylate bromide co-N,N-dibutyl methacrylamide], poly[2-dimethylammoniumethyl methacrylate tosylate co-N,N-dibutyl methacrylamide], poly[2-dimethylammoniumethyl methacrylate bromide co-N,N-dibutylacrylamide], poly[2-dimethylammoniumethyl methacrylate tosylate co-N,N-dibutylacrylamide], or mixtures thereof.

5. A developer in accordance with claim 1 wherein the resin is a copolymer of ethylene and an $\alpha$, $\beta$ ethylenically unsaturated acid selected from the group consisting of acrylic acid and methacrylic acid; a copolymer of ethylene acrylic or methacrylic acid, alkylester of acrylic or methacrylic acid; or a copolymer of ethylene and methacrylic acid with a melt index at 90° C. of 500.

6. A developer in accordance with claim 2 wherein the resin is a copolymer of ethylene and an $\alpha$, $\beta$ ethylenically unsaturated acid selected from the group consisting of acrylic acid and methacrylic acid; a copolymer of ethylene acrylic or methacrylic acid, alkylester of acrylic or methacrylic acid; or a copolymer of ethylene and methacrylic acid with a melt index at 190° C. of 500.

7. An electrostatic developer in accordance with claim 1 containing a colorant, pigment, or dye.

8. An electrostatic developer in accordance with claim 7 wherein the colorant is present to about 60 percent by weight based on the total weight of the developer solids.

9. An electrostatic developer in accordance with claim 2 containing a colorant, pigment, or dye.

10. A developer in accordance with claim 9 wherein the pigment is black, cyan, magenta, yellow, or mixtures thereof.

11. A developer in accordance with claim 10 wherein the pigment is carbon black.

12. A developer in accordance with claim 1 wherein the charge director is present in an amount of from about 0.1 to about 10 weight percent based on the weight of the developer solids and there is enabled a negatively charged toner.

13. A developer in accordance with claim 3 wherein component (A) is present in an amount of from about 85 percent to about 99.9 percent by weight, based on the total weight of the liquid developer, the total weight of developer solids is from about 0.1 percent to about 15 percent by weight, and component (C) is present in an amount of from about 0.25 to about 1,500 milligrams/gram developer solids.

14. A developer in accordance with claim 3 wherein component (D) is present in an amount of from about 0.1 to about 15 percent by weight based on the total weight of developer solids.

15. A developer in accordance with claim 3 further containing a charge adjuvant selected from the group consisting of polyhydroxy compounds which contain at least 2 hydroxy groups, amino alcohol, polybutylene succinimide and metallic soaps.

16. A developer in accordance with claim 1 wherein the liquid is an aliphatic hydrocarbon.

17. A developer in accordance with claim 2 wherein the liquid is an aliphatic hydrocarbon.

18. A developer in accordance with claim 16 wherein the aliphatic hydrocarbon is a mixture of branched hydrocarbons of from about 12 to about 20 carbons atoms.

19. A developer in accordance with claim 17 wherein the aliphatic hydrocarbon is a mixture of branched hydrocarbons of from about 12 to about 20 carbons atoms.

20. A developer in accordance with claim 16 wherein the aliphatic hydrocarbon is a mixture of normal hydrocarbons of from about 10 to about 20 carbon atoms.

21. A developer in accordance with claim 17 wherein the aliphatic hydrocarbon is a mixture of normal hydrocarbons of from about 10 to about 16 carbon atoms.

22. A developer in accordance with claim 1 wherein the resin is an alkylene polymer, a styrene polymer, an acrylate polymer, a polyester, or mixtures thereof.

23. A developer in accordance with claim 2 wherein the resin is an alkylene polymer, a styrene polymer, an acrylate polymer, a polyester, or mixtures thereof.

24. A developer in accordance with claim 3 wherein the resin is an alkylene polymer, a styrene polymer, an acrylate polymer, a polyester, or mixtures thereof.

25. An imaging method which comprises forming an electrostatic latent image followed by the development thereof with the liquid developer of claim 1.

26. A liquid developer comprised of a liquid component, thermoplastic resin, and a charge director comprised of an ammonium protonated AB diblock copolymer.

27. A liquid electrostatographic developer comprised of (A) a liquid having viscosity of from about 0.5 to about 20 centipoise and resistivity greater than $5\times10^9$; (B) thermoplastic resin particles with an average volume particle diameter of from about 0.1 to about 30 microns; (C) a charge director comprised of a protonated AB diblock copolymer; and optionally (D) a charge adjuvant.

28. A developer in accordance with claim 2 wherein there is selected a mixture of said charge directors.

29. A liquid electrostatographic developer in accordance with claim 1 with two of said AB diblock copolymers with from about 0.1 to about 99.9 weight percent of one polymer and from about 0.1 to about 99.9 weight percent of a second polymer.

30. A developer in accordance with claim 1 wherein R is alkyl with from 1 to about 25 carbon atoms.

31. A developer in accordance with claim 30 wherein alkyl is methyl, ethyl, propyl, butyl, pentyl, hexyl, heptyl, octyl or decyl.

32. A developer in accordance with claim 1 wherein R″ contains about 6 to about 12 carbon atoms.

* * * * *